UNITED STATES PATENT OFFICE.

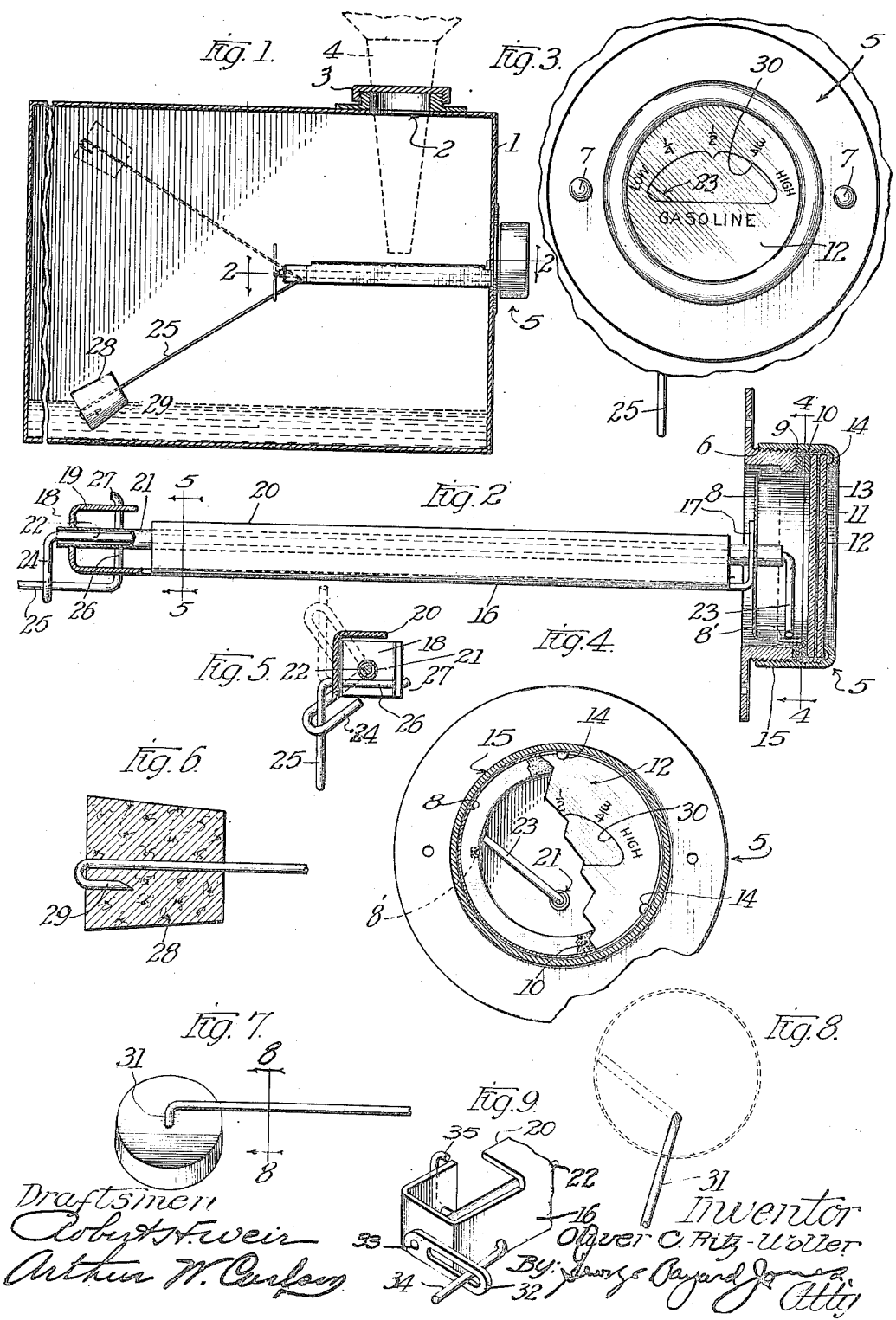

OLIVER C. RITZ-WOLLER, OF CHICAGO, ILLINOIS.

GASOLENE-GAGE.

1,231,300.

Specification of Letters Patent.

Patented June 26, 1917.

Application filed June 9, 1915. Serial No. 32,992.

*To all whom it may concern:*

Be it known that I, OLIVER C. RITZ-WOLLER, a citizen of the United States, residing at Chicago, in the county of Cook and State of Illinois, have invented new and useful Improvements in Gasolene-Gages, of which the following is a full, clear, concise, and exact description, reference being had to the accompanying drawing, forming a part of this specification.

My invention relates to improvements in gasolene gages such as are used on automobiles.

The objects of the invention are to provide a very simple, direct acting device of this character, and one which lends itself to economical manufacture; to provide a gage the indicating dial and needle of which are not rendered obscure or fogged by the leakage of gasolene into the gage cup; and to provide a gage which is protected against damage by the careless use of the funnel through which the gasolene is poured into the tank or reservoir. Other objects will be apparent without specific enumeration thereof.

In the accompanying drawings, I have illustrated two embodiments of the invention, which, however, may be embodied in other forms.

Figure 1 is a central sectional elevation through the gasolene tank showing the gage in side elevation.

Fig. 2 is an enlarged section on the line 2, 2 of Fig. 1.

Fig. 3 is a front elevation of the gage.

Fig. 4 is a section on the line 4, 4 of Fig. 2.

Fig. 5 is a section on the line 5, 5 of Fig. 2.

Fig. 6 is an enlarged sectional elevation of the float.

Fig. 7 is a top plan view of a modified construction.

Fig. 8 is a section on the line 8, 8 of Fig. 7.

Fig. 9 is a perspective view of a further modification.

The gasolene tank or reservoir 1 to which the gage is applied, may be of any suitable construction. It is provided with an upper opening 2 normally closed by a cap 3 through which opening the gasolene is introduced into the tank usually by pouring it through a funnel 4. The usual outlet for the gasolene (not shown) is also provided.

The gage 5 is mounted on one of the walls of the tank and projects into the interior thereof. It consists of a supporting plate in the form of a flange secured by rivets 7 or other suitable means to said wall. The body of the gage cup 8 is made preferably of sheet metal flanged outwardly and fitting over the end wall of the ring 6, a cork ring 9 or other suitable packing being interposed between the two. An additional cork ring 10 is arranged outside of said flange against which ring two glass disks 11, 12 are arranged, said disks being separated by a screen 13 of paper, celluloid or other suitable material having the various words and figures printed thereon, shown in Fig. 3 and constituting a dial. The outer glass disk is held in place by bending over small projections or lugs 14 constituting integral extensions of the cup 8. The glass is further clamped in place by means of an internally threaded ring 15 screwed over the ring 6 and having its edge turned inwardly to form a flange which bears directly against the outer glass disk and compresses all the parts between itself and the ring 6. The gage cup is thereby rendered air tight for a purpose hereinafter explained.

Secured to the gage cup 8 by soldering, or in some other suitable manner, is an arm or bracket 16 having one end 17 turned at a right angle as shown in Fig. 2, having its other end 18 also bent at a right angle and provided with a further extension 19. The bracket 16 is stiffened and protected by a flange 20 forming with said bracket, an angle bar. The arms 17, 18 are provided with openings which receive the tube 21 within which a spindle 22 turns freely. The tube 21 passes through an opening in the gage cup 8 located at a point below the center thereof as shown in Fig. 4. The end of the spindle 22 is bent at a right angle to form an indicator or needle 23, the movement of said needle to the right and the left being limited by the walls of the cup, which walls therefore form stops as indicated in Fig. 4. The other end of the spindle is bent to form a hook 24. Said hook fits loosely over a rod 25 one end 26 of which is bent at a right angle and passes through openings in the bar 16 and the extension 19, the tip of said rod 27 being bent to prevent withdrawal from said openings. The other end of the rod has a float 28 mounted thereon, said float consisting, preferably of a cork through which the rod 25 passes, the sharpened end of said rod being bent in the form of a hook 29 and embedded in the cork to securely hold it. The cork is preferably coated with varnish or shellac to render it impervious to gasolene.

It will be seen that as the level of the gasolene rises and falls, the float 28 will rise and fall with it, thereby swinging the rod 25 about its pivot 26. This up and down movement will be communicated to the hook 24 in a plane at right angles to the movement of the rod 25, and the spindle 22 will be rotated accordingly, thereby causing the indicator or needle 23 to swing across the dial behind the same. The movement of the needle is visible through the opening 30, however, as will be apparent in Fig. 3. The readings on the dial are low, high and fractional readings indicating approximately the fractional extent to which the capacity of the tank is being utilized at any particular time. Of course, readings may be employed, if desired, which indicate the amount of gasolene in gallons or any other terms.

As previously stated, the movement of the needle 23 is limited by the walls of the cup 8, these stops also limiting the up and down throw of the cork whereby it is prevented from touching either the top or the bottom of the tank. This prevents the coat of varnish from cracking by striking said walls. It also prevents rattling. The stiffening flange 20 projects over the spindle 22 and protects it from injury by the funnel 4, which, through careless use, might be dropped or forcibly pushed down into the tank where its lower end might strike said rod and bend it, or otherwise injure the gage. The rod is further protected by being inclosed within the tube 21. However, said tube is not essential and may be omitted. If gasolene leaks into the gage cup through the tube 21 where one is employed, or through the opening through which the spindle 22 passes, where no tube is employed, said gasolene compresses the air within said cup as the level rises. Said air cup being air-tight, the level of the gasolene cannot rise completely to the top even though the gasolene tank is filled. The opening 30 in the dial is located at such a height as to be always above the gasolene level. As a result, the glass is not clouded or fogged, and the position of the indicator 23 is not rendered obscure by being immersed in the liquid. The use of double glass disks not only aids in maintaining an air-tight chamber, but serves as a further precaution in that the outer disk may be broken without necessarily breaking the inner disk, whereby the air-tight seal is not necessarily destroyed. The two disks also support the indicating screen between them, which screen may be of thin flexible material requiring some reinforcement to hold it in place.

In Figs. 7 and 8, I have illustrated a simplified construction in which the spindle 22 is bent to provide an integral arm 31 having a cork float secured directly to it. This eliminates any looseness or back lash since one end of the spindle carries the float and the other end constitutes the indicator. A continuous rod is thus employed.

Fig. 9 illustrates a further slight change in the first form of device described. The spindle, instead of having its end bent as shown in Fig. 2, has a stamped out piece of metal 32 in the form of a loop fitted over the end 33 thereof. Through the loop a rod 34 passes which is generally similar to the rod 25 previously described except that the end thereof 35 is bent in such a way as to have its movement obstructed by its supporting bracket beneath it, thereby limiting the up and down movement of the float.

From the above description, it will be apparent that the gage is exceedingly simple and direct-acting requiring few stamping or punching operations. It therefore lends itself to economical manufacture. Although the device has been described thus far as a gasolene gage, it is apparent that it is adapted to indicate the level of liquids in general, and it is not necessarily limited to the use implied herein. Various changes may be made in the three forms illustrated, and various other forms of the invention may be devised which fall within the scope of the appended claims.

Having thus described my invention, what I claim as new and desire to secure by Letters Patent of the United States is:

1. A gasolene gage comprising a cup, a dial therefor, a rod passing through an opening in said cup, said rod having both ends bent at an angle thereto, a float, means whereby one of said ends is connected to said float, the other of said ends serving as an indicating needle and means secured to said cup for supporting and protecting said rod, said float connecting means being pivotally connected to said rod supporting means and arranged to move in a plane at an angle to the plane of movement of said needle.

2. A gasolene gage comprising a supporting ring, a gage cup mounted thereon, two glass disks compressed by extensions on said cup, packing rings between said respective parts and means for clamping the latter together to provide an air-tight chamber in said cup, a dial between said glass disks, and a rod passing through an opening in the lower part of said cup with an arm thereon at an angle thereto and extending behind said glass parallel and adjacent thereto to form an indicator, said dial having an opening therein through which said indicator is visible.

3. A gasolene gage comprising a gage cup secured to a gasolene tank, an angle bar secured to said cup and extending horizontally into said tank, a spindle rotatably mounted at the ends of said bar, one flange of said angle bar serving to stiffen the same, and the other flange thereof serving to protect said spindle from damage by the funnel.

4. A gasolene gage comprising a gage cup, the base of which is provided with an opening, a plurality of glass disks fitted within said cup and spaced away from the base thereof to form an air-tight chamber, a dial clamped between said glass disks, and a rod passing through said opening in the base of said cup and having an indicator thereon adapted to operate within said air-tight chamber, in the rear of said dial and said glass disks.

In witness whereof, I have hereunto subscribed my name this 2nd day of June, 1915.

OLIVER C. RITZ-WOLLER.